(12) United States Patent
Rodriguez Bravo et al.

(10) Patent No.: US 11,119,750 B2
(45) Date of Patent: Sep. 14, 2021

(54) DECENTRALIZED OFFLINE PROGRAM UPDATING

(71) Applicant: International Business Machines Corporation, Armonk, NY (US)

(72) Inventors: Cesar Augusto Rodriguez Bravo, Alajuela (CR); Craig M. Trim, Ventura, CA (US); Gregory J. Boss, Saginaw, MI (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/420,254

(22) Filed: May 23, 2019

(65) Prior Publication Data

US 2020/0371772 A1   Nov. 26, 2020

(51) Int. Cl.
| | | |
|---|---|---|
| *G06F 9/44* | (2018.01) | |
| *G06F 8/65* | (2018.01) | |
| *G06F 8/61* | (2018.01) | |
| *G06F 21/57* | (2013.01) | |
| *G06F 8/71* | (2018.01) | |

(52) U.S. Cl.
CPC ............... *G06F 8/65* (2013.01); *G06F 8/61* (2013.01); *G06F 8/71* (2013.01); *G06F 21/572* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 6,594,664 B1 | 7/2003 | Estrada et al. | |
| 7,113,962 B1 | 9/2006 | Kee et al. | |
| 7,197,634 B2 | 3/2007 | Kruger et al. | |
| 7,574,481 B2 | 8/2009 | Moore et al. | |
| 9,411,621 B2 | 8/2016 | Jeswani | |
| 10,021,551 B2 | 7/2018 | Dikeman | |
| 2004/0133640 A1* | 7/2004 | Yeager | G06F 9/4862 709/204 |
| 2006/0048144 A1* | 3/2006 | Willess | G06F 8/61 717/177 |
| 2006/0080651 A1* | 4/2006 | Gupta | G06F 8/658 717/169 |
| 2006/0277299 A1* | 12/2006 | Baekelmans | G06F 11/0709 709/224 |

(Continued)

OTHER PUBLICATIONS

"Naive Bayes classifier", Wikipedia, 10 pages, This page was last edited on Feb. 5, 2019, retrieved from the Internet on Feb. 19, 2019, <https://en.wikipedia.org/wiki/Naive_Bayes_classifier>.

(Continued)

*Primary Examiner* — Insun Kang
(74) *Attorney, Agent, or Firm* — David K. Mattheis; Maeve M. Carpenter

(57) ABSTRACT

Managing program updates by connecting a first device and a second device using a local communications protocol. By comparing software versions of the first device and second device and requesting a first version of software of the first device which differs from a second version of the software of the second device. Further by determining the validity of the first version of the software and acting upon the validity of the first version of the software.

20 Claims, 4 Drawing Sheets

(56) References Cited

U.S. PATENT DOCUMENTS

| | | | |
|---|---|---|---|
| 2007/0250608 A1* | 10/2007 | Watt | H04L 67/1008 |
| | | | 709/222 |
| 2008/0209136 A1* | 8/2008 | Qi | G06F 9/5072 |
| | | | 711/148 |
| 2009/0106606 A1* | 4/2009 | Duan | G05B 23/0218 |
| | | | 714/48 |
| 2009/0113413 A1* | 4/2009 | Reinz | G16H 40/40 |
| | | | 717/173 |
| 2010/0180104 A1* | 7/2010 | Henry | G06F 9/32 |
| | | | 712/208 |
| 2011/0252006 A1* | 10/2011 | Smith | G06Q 10/107 |
| | | | 707/691 |
| 2011/0265076 A1* | 10/2011 | Thorat | G06F 8/65 |
| | | | 717/172 |
| 2012/0158843 A1 | 6/2012 | Angani et al. | |
| 2012/0204171 A1* | 8/2012 | Reisman | G06F 8/65 |
| | | | 717/172 |
| 2014/0189706 A1* | 7/2014 | Baek | G06F 9/5094 |
| | | | 718/104 |
| 2014/0208314 A1* | 7/2014 | Jeswani | G06F 8/65 |
| | | | 718/1 |
| 2014/0227976 A1* | 8/2014 | Callaghan | G06F 8/65 |
| | | | 455/41.2 |
| 2014/0259005 A1* | 9/2014 | Jeffrey | G06F 8/65 |
| | | | 717/173 |
| 2015/0169312 A1* | 6/2015 | Patel | G06F 8/20 |
| | | | 717/170 |
| 2015/0178064 A1* | 6/2015 | Cairns | G06F 8/65 |
| | | | 717/171 |
| 2015/0199499 A1* | 7/2015 | Shaikh | G06F 21/10 |
| | | | 726/29 |
| 2015/0309786 A1* | 10/2015 | Resch | G06F 3/0689 |
| | | | 717/171 |
| 2016/0004871 A1* | 1/2016 | Guedalia | H04W 4/023 |
| | | | 726/26 |
| 2016/0026455 A1* | 1/2016 | Jeffrey | G06F 8/65 |
| | | | 709/217 |
| 2016/0041821 A1 | 2/2016 | Erickson et al. | |
| 2016/0164905 A1* | 6/2016 | Pinney Wood | G06F 21/577 |
| | | | 726/25 |
| 2016/0196128 A1 | 7/2016 | Wang et al. | |
| 2017/0034023 A1* | 2/2017 | Nickolov | H04L 43/0817 |
| 2017/0091221 A1* | 3/2017 | Yin | G06F 16/188 |
| 2017/0249135 A1* | 8/2017 | Gandhi | G06F 8/65 |
| 2017/0322790 A1* | 11/2017 | Surdu | G06F 21/105 |
| 2017/0331885 A1* | 11/2017 | Jakatdar | H04L 63/102 |
| 2017/0373933 A1* | 12/2017 | Subramanian | H04L 41/0806 |
| 2018/0034936 A1* | 2/2018 | Correia e Costa | H04L 67/34 |
| 2018/0075078 A1* | 3/2018 | Dandy | G06F 16/2372 |
| 2018/0119975 A1* | 5/2018 | Park | G06F 21/602 |
| 2018/0145991 A1* | 5/2018 | McCauley | H04L 63/0428 |
| 2018/0285088 A1* | 10/2018 | Lancioni | H04W 4/70 |
| 2018/0324205 A1* | 11/2018 | Ali-Ahmad | H04L 63/1408 |
| 2019/0057214 A1* | 2/2019 | Xia | G06F 11/1433 |
| 2019/0095194 A1* | 3/2019 | Gandhi | G06F 8/65 |
| 2019/0097907 A1* | 3/2019 | Nickolov | H04L 43/0817 |
| 2019/0163465 A1* | 5/2019 | Fassino | G06F 8/65 |
| 2019/0163466 A1* | 5/2019 | Kiyama | G06F 8/65 |
| 2019/0187970 A1* | 6/2019 | Zhuang | G06F 8/65 |
| 2019/0207957 A1* | 7/2019 | Espinosa | G06F 21/606 |
| 2019/0229913 A1* | 7/2019 | Fava | H04L 9/32 |
| 2019/0235855 A1* | 8/2019 | Nakano | G06F 9/445 |
| 2019/0250898 A1* | 8/2019 | Yang | H04L 67/34 |
| 2019/0250899 A1* | 8/2019 | Riedl | H04L 9/0825 |
| 2019/0288913 A1* | 9/2019 | Salgueiro | H04L 41/0893 |
| 2019/0325115 A1* | 10/2019 | Wilkinson | G06F 21/64 |
| 2019/0332369 A1* | 10/2019 | Gupta | G06F 8/65 |
| 2019/0335005 A1* | 10/2019 | Dain | H04L 67/16 |
| 2019/0356637 A1* | 11/2019 | Gleichauf | H04L 29/06 |
| 2019/0377564 A1* | 12/2019 | Poenaru | G06F 3/065 |
| 2020/0012488 A1* | 1/2020 | Koval | G06F 8/71 |
| 2020/0034282 A1* | 1/2020 | He | G06F 11/3688 |
| 2020/0192745 A1* | 6/2020 | Harty | H04L 63/02 |
| 2020/0204381 A1* | 6/2020 | Meyer | H04W 12/00401 |
| 2020/0272453 A1* | 8/2020 | Lodieu | G06F 8/71 |
| 2020/0285752 A1* | 9/2020 | Wyatt | G06F 21/577 |

OTHER PUBLICATIONS

Alcon, Joel, 5 Risks of Outdated Software, Browsers & Operating Systems, BITSIGHT, The Standard in Security Ratings, Aug. 14, 2017, 7 pages, <https://www.bitsight.com/blog/outdated-software-issues>.

Lazar, Michael, "BYOD Statistics Provide Snapshot of Future", Insight, Nov. 16, 2017, 9 pages, <https://www.insight.com/en_US/learn/content/2017/01182017-byod-statistics-provide-snapshot-of-future.html>.

Maddox, Teena, "How to write a good security policy for BYOD or company-owned mobile devices", ZDNet, Apr. 3, 2018, 7 pages, <https://www.zdnet.com/article/how-to-write-a-good-security-policy-for-byod-or-company-owned-mobile-devices/>.

Mell et al., "The NIST Definition of Cloud Computing", Recommendations of the National Institute of Standards and Technology, Special Publication 800-145, Sep. 2011, 7 pages.

Rusen, Ciprian Adrian, "How to set Windows 10 to download updates from the local network or the internet", Digital Citizen, published on Dec. 18, 2017, 6 pages, <https://www.digitalcitizen.life/how-set-windows-10-get-updates-local-network-internet>.

* cited by examiner

DECENTRALIZED OFFLINE PROGRAM UPDATING

BACKGROUND

The disclosure relates generally to managing computing system software updates. The disclosure relates particularly to managing software updates of computing systems which are not connected to a network.

Device security issues can be associated with malicious code loaded onto the device during an application installation or a software update. Networked devices represent a greater security risk than non-networked devices. The network connection potentially exposes a device to more security threats associated with malicious code. Non-networked devices used for sensitive work can be maintained as stand-alone devices with an air-gap present between the device and network borne threats.

SUMMARY

Aspects of the invention disclose methods, systems and computer readable media associated with managing application updates by connecting a first device and a second device using a local communications protocol, comparing software versions of the first device and second device, requesting a first version of software of the first device which differs from a second version of the software of the second device, determining the validity of the first version of the software; and acting upon the validity of the first version of the software.

DETAILED DESCRIPTION

Figure 1:
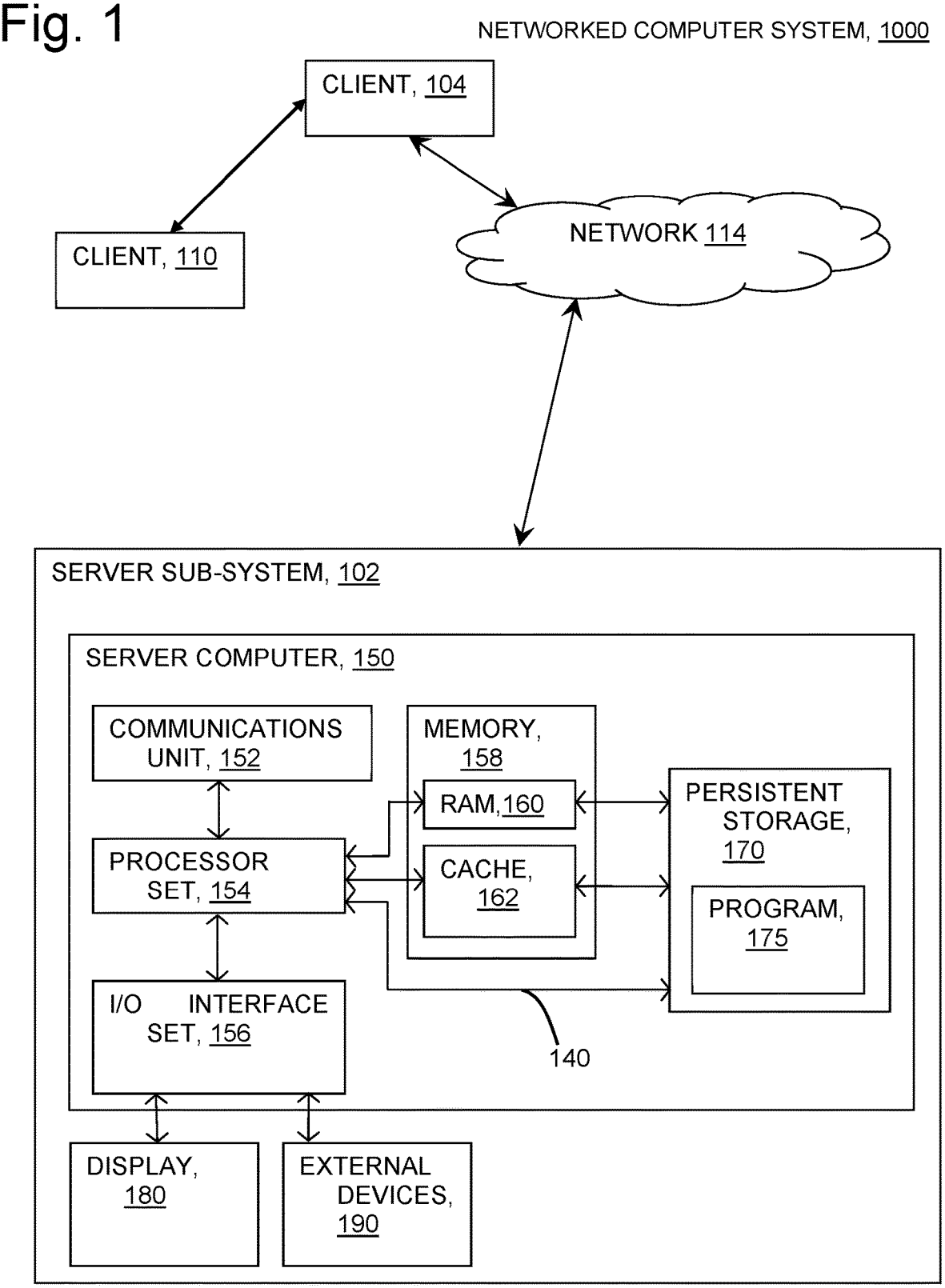
FIG. 1 provides a schematic illustration of a system, according to an embodiment of the invention.

New software and software updates must occasionally be installed on stand-alone computing devices used for sensitive work. One pathway to these updates and installations is to temporarily connect the devices to a trusted network to accomplish the necessary software tasks. Even such temporary connections reduce the security of the device by exposing it to threats carried by software on the network. What is needed is a method to facilitate software updates and installations on a device without connecting the device to a network including a public network.

In an embodiment, a system is deployed across a set of associated devices. The devices may be under common ownership or control, or the users of the devices may be part of a common organization. The deployed system can include software instructions enabling software updates to be deployed to otherwise isolated devices, reducing or eliminating any need to connect the isolated devices to a broad network including any need to connect the devices to the internet. In an embodiment, the deployed system includes cloud, or other remote resources accessed by some, or all, system devices. In an embodiment, system devices are configured as willing to share and receive updates, willing to share but not receive updates, or willing to receive but not share updates as system administrators or individual users desire.

In an embodiment, each device of the deployed system scans its environment for other devices of the system. The scanning can be accomplished using local communications protocols including BLUETOOTH, WIFI, NFC, and other local communications protocols. (Note: the term(s) "BLUETOOTH", "WIFI", and "NFC" may be subject to trademark rights in various jurisdictions throughout the world and are used here only in reference to the products or services properly denominated by the marks to the extent that such trademark rights may exist.)

The scanning can lead to two devices recognizing each other as parts of the system. Two devices are selected for purposes of example only. Additional devices can also be recognized. In some embodiments, typical system interactions revolve around interactions between pairs of devices. In an embodiment, after recognition, the system software scans the software inventory, operating system, device drivers, device firmware, and applications, of each device to determine the versions of each element of the devices software inventory. In an embodiment, the system maintains a running inventory of a device software inventory rather than performing an inventory scan after recognition.

After a current inventory of each device is available, the system compares the respective inventories of the devices. The system uses the inventory comparison to determine if one device possesses a newer version of an inventory element (also referred to as an "inventory item" or a "software item") than the other device. The system requests any inventory items having a newer version from which ever device possesses that version (the originating device). A copy is made of the requested software item and passed to the system. In an embodiment, the system passes the copy of the newer version of the inventory item to the other device (destination device) for validity review. In an embodiment, the system retains the copy on the originating device and reviews the inventory item's validity prior to passing it the destination device. The system determines the validity of the update and then undertakes at least one activity associated with the determined validity as described below.

The system can check any digital signatures and digital certificates, etc., associated with the item to ensure that they exist and are authentic. Each device of the system can maintain a listing of authentic and problematic software items as well as a current listing of appropriate signatures and certificates for software inventory items. By maintaining a local listing, the system can validate software versions without an internet or other public network connection. (This listing can also be checked between devices to determine if one device has a more up-to-date version of the list than the other device, and therefore that the list needs to be validated and updated as well.)

In an embodiment, the system passes information regarding pending updates to a risk factor identification module. The module evaluates pending updates according to risk factors associated with the number of pending updates, the time of day and day of the week, previous updates, the size and type of pending updates—large or small, OS, firmware, software, and device driver. In an embodiment, module risk factors include data from previous interactions and updates associated with the originating device.

In an embodiment, the system uses risk factor module output to automatically accept or reject pending updates according to the output in terms of present risk factor thresholds. In an embodiment, a user can set thresholds and/or over ride update decisions based upon risk factor module outputs.

In an embodiment, the system uses unsupervised machine learning to establish risk factors according to upgrade predictions and other data. In this embodiment, the system uses the elapsed time since a previous device upgrade, device specific back-up systems, user feedback associated with manual upgrades, device tracking and performance efficiency data, device task prioritization data regarding operations redundancy prior to updates, and dynamic prioritization between local tasks data prior to updates. In an embodiment, the system uses a machine learning structure such as a Naïve Bayes classifier, or similar machine learning algorithm, to determine a likelihood associated with a pending update and then determine a risk level based upon the likelihood.

In an embodiment, the system evaluates alternate device availability as a factor in the timing of pushing updates out to devices. In an embodiment, the timing relates to a single device or a plurality of devices. For example, update push timing is advanced when alternate devices are available to replace a device offline for updates, such that system performance will be maintained as a device update occurs, and delayed when alternate devices are not available, until device availability will not impact overall system performance. In an embodiment, the system adjusts the update timing to accommodate device availability and achieve overall system performance requirements. In an embodiment, the system uses data from past updates and/or known calendar events to determine device availability changes associated with updates. In an embodiment, the system alters update push timing according to user input.

In an embodiment, the system checks item validity using a reliability score determined for the device pairing. In this embodiment, the system uses the reliability score to differentiate between friendly/trusted and unfriendly/untrusted devices. In this embodiment, the system determines the reliability score by considering relationships between the two devices, such as common connections. For example, devices connected to a common local network, without an internet connection while one device has a separate connection to the internet using another communications channel, can be considered more friendly than unfriendly. In an embodiment, the system considers devices having common security applications as more friendly than unfriendly. For example, each device may possess a mobile device management-as-a-service (MaaS) application to enhance device security. (Such MaaS software can also be checked as part of the software inventory for version differences requiring an upgrade). In an embodiment, the system considers devices paired for another task as more friendly than unfriendly. In an embodiment, the system considers Internet of Things (IoT) devices serving as part of a common IoT community or network, more friendly than unfriendly. In an embodiment, the system considers devices having the same service provider to be more friendly than unfriendly.

In an embodiment, the system considers "jailbroken' devices which have undergone changes to remove device manufacturer of service provider restrictions more unfriendly than friendly. In an embodiment, the system considers devices which obfuscate system requested data, such as service provider name, and inventory item information including version, signature, certificate information, more unfriendly than friendly. In an embodiment, the system considers devices having an inventory item known to be malicious more unfriendly than friendly. (A listing of malicious software items can be maintained locally on each device and updated using the disclosed methods.) In an embodiment, the system considers devices having incongruent inventory item data more unfriendly than friendly. For example, an item can have an invalid or incorrect version number, or a version number which has not yet been released. In an embodiment, the system considers devices having items which are not signed by the manufacturer, more unfriendly than friendly.

In an embodiment, a uniform algorithm is used for the reliability score. A single positive point is given for friendly attributes and a single negative point is given for unfriendly attributes. Devices with a net positive score are considered friendly and updates from those devices are accepted. In an embodiment, a threshold is set for the reliability score and updates are only accepted from devices having a score above the threshold.

In an embodiment, each friendly (positive) and unfriendly (negative) reliability attribute is given a weighting factor according to the objectives of the system administrator. In this embodiment, the sum of the weighted attribute is calculated, and updates are accepted from devices having a net positive reliability score, or a positive reliability score above a defined threshold value.

In an embodiment, the system further considers the age of the device (older devices are less friendly than newer devices), current state of the device (devices with all firmware, OS, and software up-to-date are friendlier than devices lacking current updates).

In an embodiment, the reliability score for a device relates to how many reliability score dimensions are considered friendly and how many are considered unfriendly. In an embodiment, individual dimensions are weighted, and the system determines the reliability score using the weighted values.

As an example, a first device is identified as possessing an application update. The device is new, and all firmware, OS and other application software updates have been applied. This device has a positive reliability score. As a second example, an aging device with out-of-date firmware, OS, and other software, is identified as having an application update. The device would have a net negative reliability score and the application update would be refused.

In an embodiment, a reliability score threshold is set. In an embodiment, the system automatically refuses updates from devices having a score below the threshold. In an embodiment, the system provides a user with information from the reliability scoring. In this embodiment, the user interacts with the scoring and can choose to adjust the scoring dimension weights. The user can review the dimensions of the score and decide to accept or reject updates from the device by accepting or over riding the reliability scoring input.

In an embodiment, the system determines that the software inventory item is valid and enables the installation of the update. In an embodiment, the system passes the validated update to the out of date device for installation. In an embodiment, the system passes a validation message to the out of date device enabling the installation of the update which was previously passed to the device.

In an embodiment, the system sends a validation message to the originating device. The validation message provides that the update has been successfully applied to the destination device. In an embodiment, the validation message includes information regarding the update and the destination device. In this embodiment, the originating device passes validation message information including the destination device meta data, to other system resources, and/or the device manufacturer. In an embodiment, destination device meta data includes device details such as manufacturer and model, OS, firmware, software inventory information, and other device information.

In an embodiment, the system determines that the updated version is not valid. In this embodiment, the system can delete the invalid update from the originating device or quarantine the files to prevent future execution of the update. In an embodiment, the system sends notifications to the requesting device as well as the originating device to notify users of the presence of the invalid update item. In an embodiment, the system analyzes the invalid item. The analysis of the item can occur locally on the device, or the item can be passed to other supervisory resources over a network communications link for analysis. In an embodiment, the system locates and sends a roll-back update to the originating device to replace the invalid update. In this embodiment, the system sources the roll-back update from the requesting device or from other system resources. In an embodiment, the system blacklists the originating device until the invalid item has been removed and/or replaced with a valid version. In this embodiment, the blacklisting of the device prevents other system devices from engaging with the blacklisted device to check for updated item versions. In an embodiment, the system maintains a running inventory of the device inventory items and their associated validity. In this embodiment, the system acts accordingly upon identifying any inventory item as invalid.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to client device 104. Client device 104 connects wirelessly to server sub-system 102 via network 114. Client devices 104 and 110 comprise update management program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the update management program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., update management program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
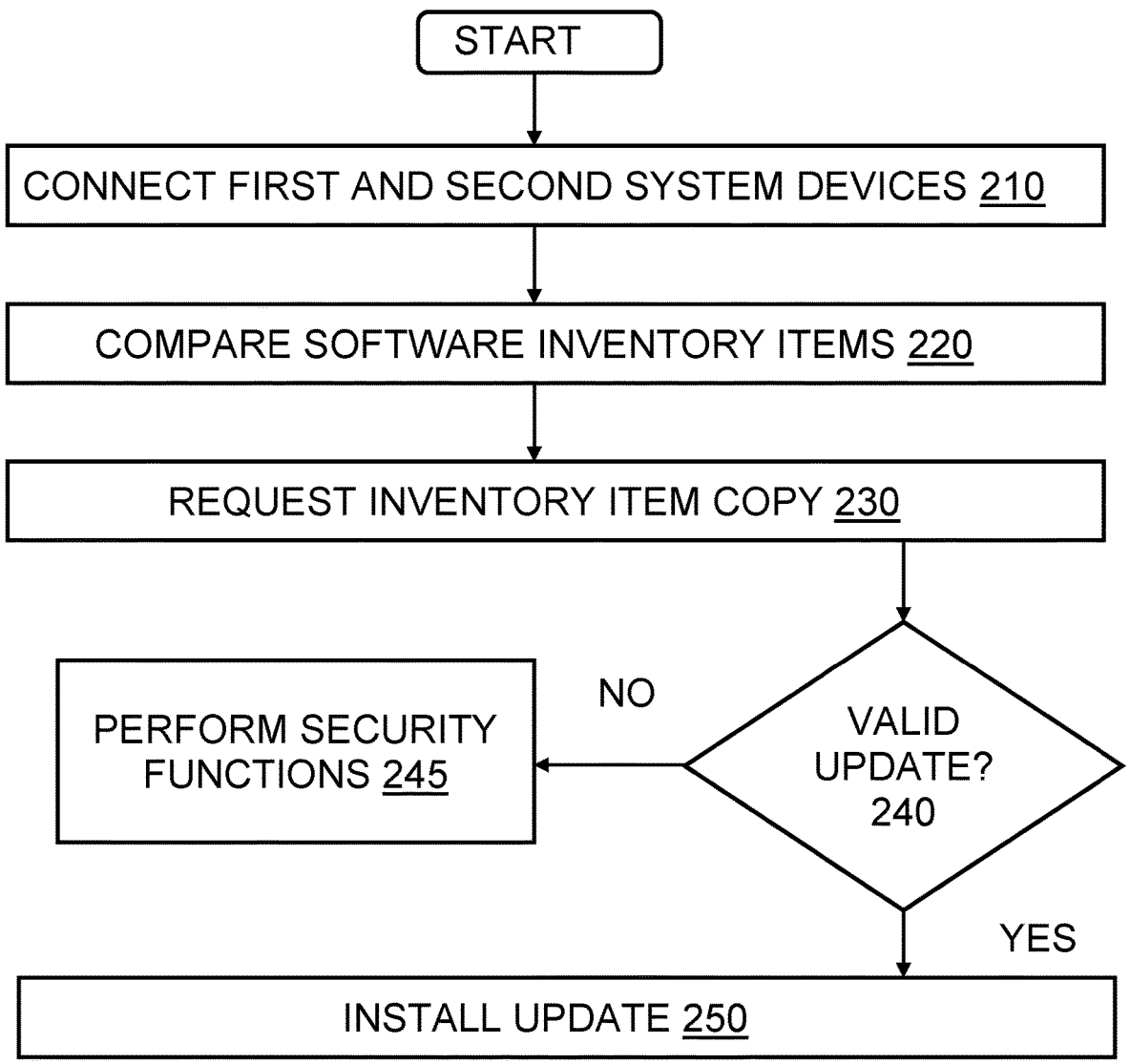
FIG. 2 provides a flowchart depicting an operational sequence, according to an embodiment of the invention.

FIG. 2 provides a flowchart 200, illustrating exemplary activities associated with the practice of the disclosure. After program start, the system connects two system devices at 210. The two devices connect using BLUETOOTH, NFC, WIFI, or other local wireless communications protocols. System devices are configured to share and receive updates, share updates only, or receive updates only. For compatibly configured devices, the system scans each device's inventory in terms of items present and item versions for the items present. At 220, the system compares the scan results for each device to ascertain whether potential item update opportunities are present. Update opportunities relate to one device having a newer version of an inventory item compared to the other device. At 230, the system requests a copy of the potential update item. The system stores the copy for validity analysis on either the originating device, the destination device or using remote resources such as cloud resources. At 240 the system determines the validity of the update according to update data, risk factor module factors, and reliability scoring. At 250, the system installs the update on the destination device after determining that the update is valid. The system passes the update and installation enabling instructions to the destination device or simply passes the enabling instructions in an instance where the update copy is stored on the destination device. After installation, the system passes confirmation messages to each of the origination and destination devices regarding the update (not shown). After a determination of invalidity at 240, the system takes any of a number of possible security related actions to remediate any risk posed by the invalid update at 245. Actions include deleting or quarantining the update, passing the update to other resources for analysis of malicious code, altering a device status, such as blacklisting the originating device, until further remediation has occurred, sending a roll-back update to the originating device, and notifying the originating and destination devices regarding the invalid update.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
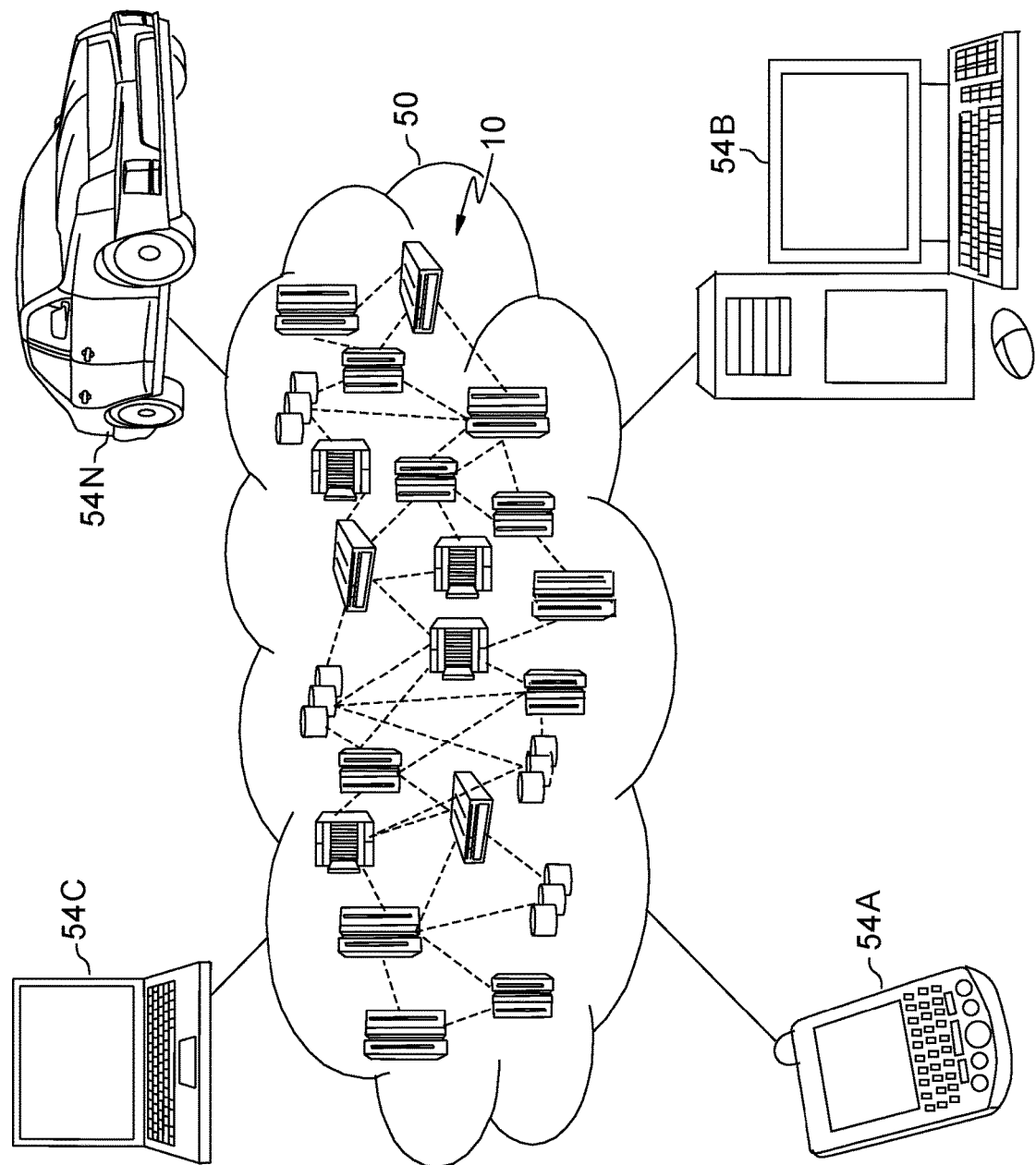
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
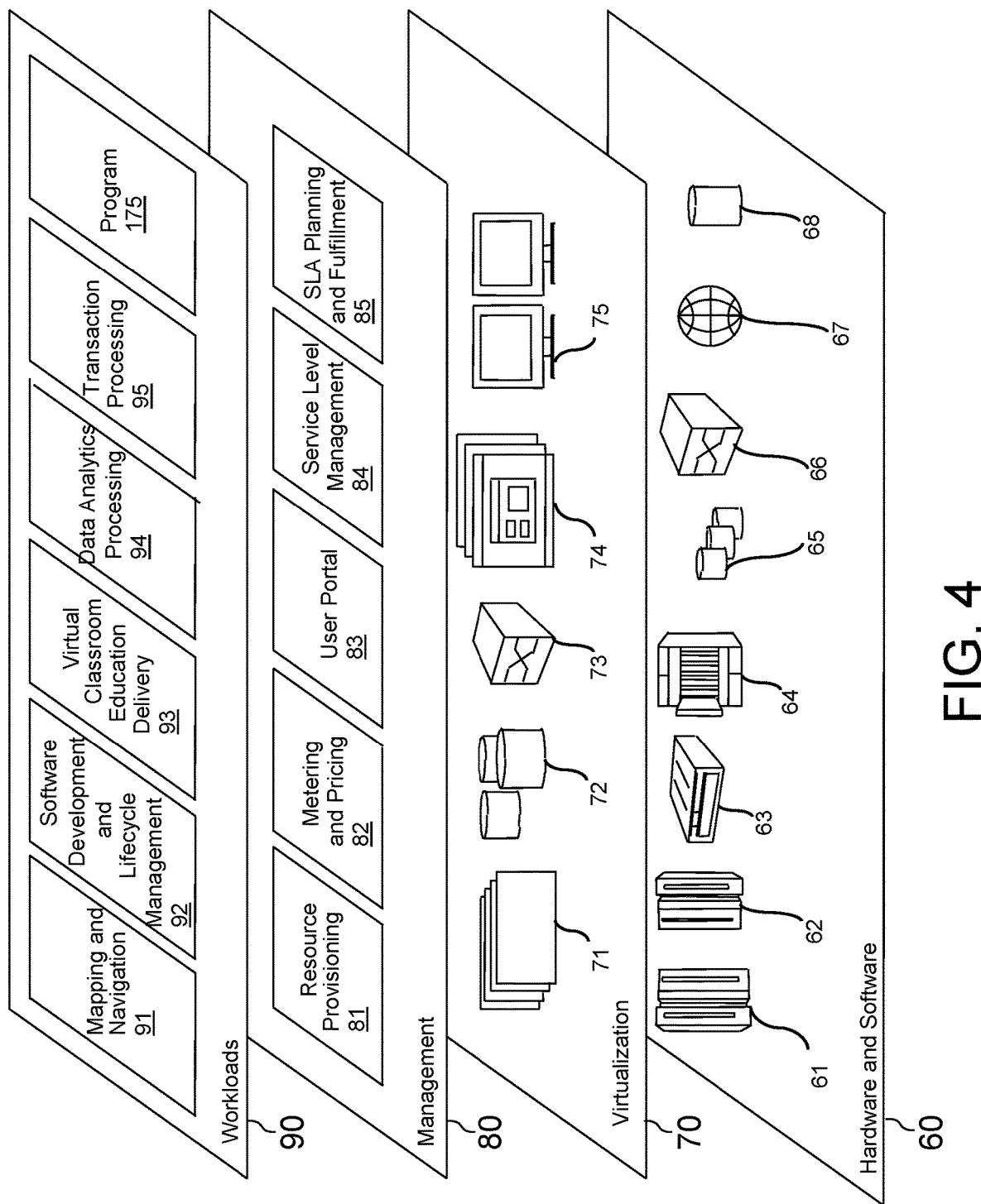
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and update management program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing application updates, the method comprising:
    connecting a first device and a second device using a local communications protocol;
    comparing software versions of the first device and second device;
    determining an availability of an alternate device to the second device;
    requesting a first version of software of the first device which differs from a second version of the software of the second device;
    determining a risk associated with the first device and first version of the software;
    determining validity of the first version of the software according to the risk by comparing local listings of signatures and certificates of the first device and the second device and using a reliability score determined by considering relationships between the first and second devices; and
    acting upon the validity of the first version of the software by replacing the second device with an available alternate device while installing the first version of the software on the second device.

2. The computer implemented method according to claim 1, further comprising:
    in response to determining the validity, sending a confirmation message to the first device.

3. The computer implemented method according to claim 1, further comprising updating the local listing of the second device according to the local listing of the first device.

4. The computer implemented method according to claim 1, wherein determining the risk includes using unsupervised machine learning to establish risk factors according to upgrade predictions.

5. The computer implemented method according to claim 1, wherein determining the validity of the first version of the software includes checking at least one of a digital signature and a digital certificate of the first version of the software.

6. The computer implemented method according to claim 1, wherein determining the validity of the first version of the software includes checking the reliability score of the first version of the software.

7. The computer implemented method according to claim 6, wherein the reliability score includes consideration of: (i) common security applications between devices, (ii) first device status, and (iii) first and second device service provider details.

8. A computer program product for managing application updates, the computer program product comprising one or more computer readable storage media and stored program instructions on the one or more computer readable storage media, the stored program instructions comprising:
   program instructions for connecting a first device and a second device using a local communications protocol;
   program instructions for comparing software versions of the first device and second device;
   program instructions for determining an availability of an alternate device to the second device; program instructions for requesting a first version of software of the first device which differs from a second version of the software of the second device;
   program instructions for determining a risk associated with the first device and first version of the software;
   program instructions for determining a validity of the first version of the software according to the risk by comparing local listings of signatures and certificates of the first device and the second device and using a reliability score determined by considering relationships between the first and second devices; and
   program instructions for acting upon the validity of the first version of the software by replacing the second device with an available alternate device while installing the first version of the software on the second device.

9. The computer program product according to claim 8, the stored program instructions further comprising:
   program instructions for sending a confirmation message to the first device.

10. The computer program product according to claim 8, the stored program instructions further comprising program instructions for updating the local listing of the second device according to the local listing of the first device.

11. The computer program product according to claim 8, wherein determining the risk includes using unsupervised machine learning to establish risk factors according to upgrade predictions.

12. The computer program product according to claim 8, wherein determining the validity of the first version of the software includes checking at least one of a digital signature and a digital certificate of the first version of the software.

13. The computer program product according to claim 8, wherein determining the validity of the first version of the software includes checking the reliability score of the first version of the software.

14. The computer program product according to claim 13, wherein the reliability score includes consideration of: (i) common security applications between devices, (ii) first device status, and (iii) first and second device service provider details.

15. A computer system for managing application updates, the computer system comprising:
   one or more computer processors;
   one or more computer readable storage devices;
   stored program instructions on the one or more computer readable storage devices for execution by one or more computer processor, the stored program instructions comprising:
   program instructions for connecting a first device and a second device using a local communications protocol;
   program instructions for comparing software versions of the first device and second device;
   program instructions for determining an availability of an alternate device to the second device;
   program instructions for requesting a first version of software of the first device which differs from a second version of the software of the second device;
   program instructions for determining a risk associated with the first device and first version of the software;
   program instructions for determining a validity of the first version of the software according to the risk by comparing local listings of signatures and certificates of the first device and the second device and using a reliability score determined by considering relationships between the first and second devices; and
   program instructions for acting upon the validity of the first version of the software by replacing the second device with an available alternate device while installing the first version of the software on the second device.

16. The computer system according to claim 15, the stored program instructions further comprising:
   program instructions for sending a confirmation message to the first device.

17. The computer system according to claim 15, the stored program instructions further comprising program instructions for updating the local listing of the second device according to the local listing of the first device.

18. The computer system according to claim 15, wherein determining the risk includes using unsupervised machine learning to establish risk factors according to upgrade predictions.

19. The computer system according to claim 15, wherein determining the validity of the first version of the software includes checking at least one of a digital signature and a digital certificate of the first version of the software.

20. The computer system according to claim 15, wherein determining the validity of the first version of the software includes checking the reliability score of the first version of the software, wherein the reliability score includes consideration of: (i) common security applications between devices, (ii) first device status, and (iii) first and second device service provider details.

* * * * *